United States Patent
Kumano et al.

(10) Patent No.: US 12,215,979 B2
(45) Date of Patent: Feb. 4, 2025

(54) VEHICLE POSITION ESTIMATION DEVICE

(71) Applicant: DENSO CORPORATION, Kariya (JP)

(72) Inventors: Shunya Kumano, Nisshin (JP); Takeshi Shikimachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 314 days.

(21) Appl. No.: 17/933,252

(22) Filed: Sep. 19, 2022

(65) Prior Publication Data
US 2023/0090861 A1    Mar. 23, 2023

(30) Foreign Application Priority Data
Sep. 22, 2021   (JP) ................. 2021-154532

(51) Int. Cl.
*G01C 21/30*      (2006.01)
(52) U.S. Cl.
CPC .................. *G01C 21/30* (2013.01)
(58) Field of Classification Search
CPC ........................................ G01C 21/30
USPC .................................. 342/357.28
See application file for complete search history.

(56) References Cited

U.S. PATENT DOCUMENTS

| | | | | |
|---|---|---|---|---|
| 12,066,561 B2* | 8/2024 | Hill | ................... | G01S 5/0247 |
| 2017/0316684 A1* | 11/2017 | Jammoussi | ........... | G08G 1/0112 |
| 2020/0003563 A1 | 1/2020 | Miyake et al. | | |
| 2020/0003567 A1 | 1/2020 | Minamiguchi et al. | | |
| 2021/0178996 A1* | 6/2021 | Verma | ................... | G07C 5/0808 |

FOREIGN PATENT DOCUMENTS

| | | | |
|---|---|---|---|
| CN | 114923492 A | * | 8/2022 |
| JP | 2021018181 A | * | 2/2021 |

OTHER PUBLICATIONS

U.S. Appl. No. 17/933,256 and its entire file history, filed Sep. 19, 2022, Kumano et al.

* cited by examiner

*Primary Examiner* — Harry K Liu
(74) *Attorney, Agent, or Firm* — Maschoff Brennan

(57) ABSTRACT

A vehicle position estimation device includes an external information acquisition unit for acquiring external information, a vehicle parameter acquisition unit for acquiring a vehicle parameter, a satellite positioning acquisition unit for acquiring a latitude and longitude of a self-position of the vehicle, a map data acquisition unit for acquiring map data, and a position estimation unit. The position estimation unit estimates the self-position, and includes a reliability calculation unit and a lane estimation unit. The reliability calculation unit calculates a reliability of each lane based on the external information and the map data when the vehicle is traveling on a road having multiple lanes. The reliability of each lane indicates a probability of the vehicle being traveling in the lane among the lanes. The lane estimation unit estimates a lane in which the vehicle is located by using the reliability calculated by the reliability calculation unit.

9 Claims, 5 Drawing Sheets

VEHICLE POSITION ESTIMATION DEVICE

CROSS REFERENCE TO RELATED APPLICATION

The present application is based on Japanese Patent Application No. 2021-154532 filed on Sep. 22, 2021, the entire disclosure of which is incorporated herein by reference.

TECHNICAL FIELD

The disclosure in this specification relates to a vehicle position estimation device that estimates a self position of a vehicle traveling on a road.

BACKGROUND

A self-position estimation device for a vehicle estimates a traveling lane of the vehicle.

SUMMARY

According to at least one of embodiment, a vehicle position estimation device mounted on a vehicle includes an external information acquisition unit, a vehicle parameter acquisition unit, a satellite positioning acquisition unit, a map data acquisition unit, and a position estimation unit. The external information acquisition unit acquires external information regarding objects and road markings around the vehicle. The vehicle parameter acquisition unit acquires a vehicle parameter related to traveling of the vehicle. The satellite positioning acquisition unit acquires a latitude and longitude of a position of the vehicle from a satellite positioning system. The map data acquisition unit acquires map data including road information about lanes. The position estimation unit estimates a self-position of the vehicle on a map based on the external information, the vehicle parameter, the latitude and longitude, and the map data. The position estimation unit includes a reliability calculation unit and a lane estimation unit. The reliability calculation unit calculates a reliability of each lane based on the external information and the map data when the vehicle is traveling on a road having multiple lanes. The reliability of each lane indicates a probability of the vehicle being traveling in the lane among the lanes. The lane estimation unit estimates a lane in which the vehicle is located by using the reliability calculated by the reliability calculation unit.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

To begin with, examples of relevant techniques will be described. A self-position estimation device according to an example that determines which lane of lanes identified by lane information corresponds to an in-lane position of a vehicle based on mutual relationships between the in-lane position and an absolute position including an error. The self-position estimation device then estimates a traveling lane based on a result of this determination.

In the technique described above, when a result of the estimation of the in-lane position by a gyro sensor has an error larger than a lane width, an accuracy in estimation of the traveling lane may deteriorate.

In contrast, according to the present disclosure, a vehicle position estimation device having an excellent accuracy in estimation of a traveling lane can be provided.

A vehicle position estimation device calculates a reliability of each lane when a vehicle is traveling on a road having multiple lanes. The reliability of each lane indicates a probability of the vehicle being traveling in the lane among the lanes. Since the reliability is calculated for each lane, the reliability is not a value that depends on an in-lane position of a vehicle. Therefore, even if an accuracy in estimation based on vehicle parameters is poor, the reliability can be calculated for each lane based on external information and map data. As a result, the vehicle position estimation device is capable of estimating a traveling lane in which the vehicle is traveling by using the reliability. So, an accuracy in estimation of the traveling lane can be increased.

First Embodiment

Hereinafter, a first embodiment of the present disclosure will be described with reference to FIGS. 1 to 7. A vehicle position estimation device 100 of the present embodiment is equipped, for example, as a part of a vehicle system 10 in a vehicle which has a navigation system or a vehicle which has an autonomous driving function. The vehicle position estimation device 100 estimates a self-position which is a vehicle position on the map, and more specifically, estimates which lane and which road a vehicle 200 travels based on various data described below during traveling of the vehicle 200. The vehicle position estimation device 100 outputs the self-position including an estimated lane to another device.

Figure 1:
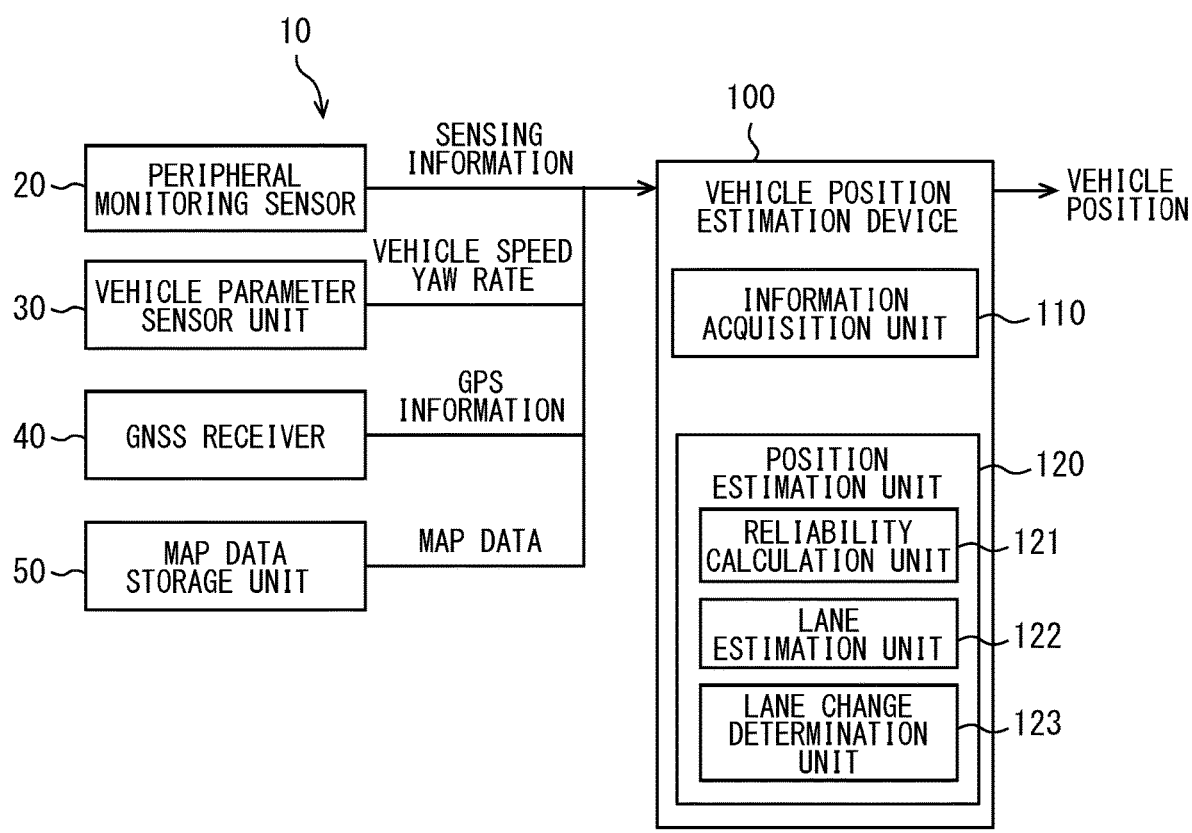
FIG. 1 is a block diagram showing a vehicle system.

The vehicle position estimation device 100 estimates the self-position of the vehicle 200 to support driver's safety driving and autonomous driving, for example. The vehicle 200 corresponds to an automobile. As shown in FIG. 1, the vehicle system 10 includes a peripheral monitoring sensor 20, a vehicle parameter sensor unit 30, a GNSS (Global Navigation Satellite System) receiver 40, a map data storage unit 50, and the vehicle position estimation device 100.

Figure 2:
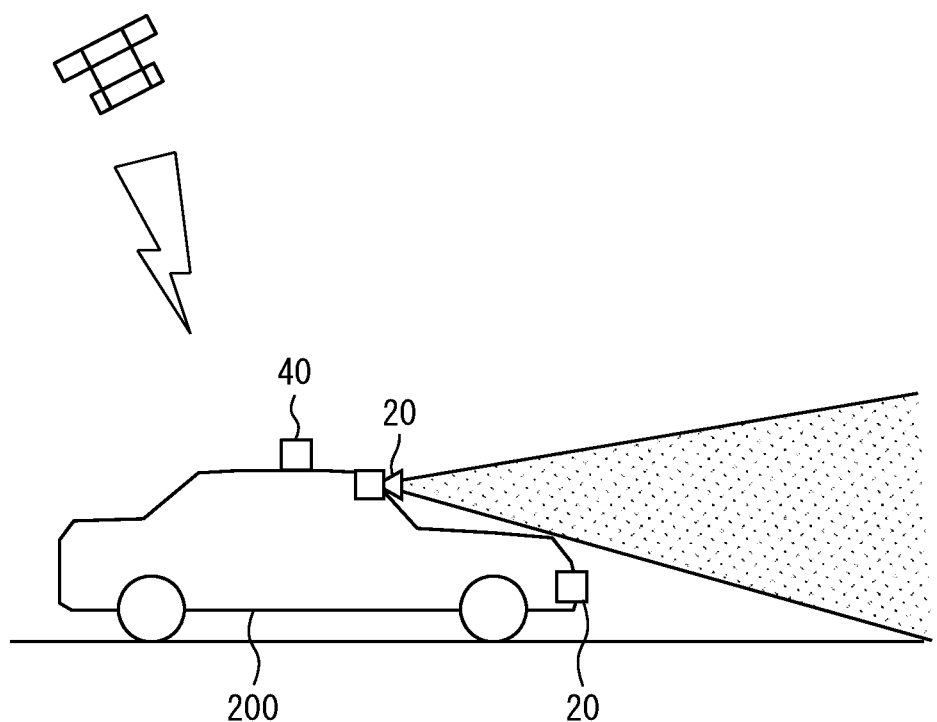
FIG. 2 is a diagram showing a side view of a vehicle.

As shown in FIG. 2, the peripheral monitoring sensor 20 is a sensor that monitors the surrounding environment of the vehicle 200. The peripheral monitoring sensor 20 is capable of detecting moving objects and stationary objects in a detection range around the vehicle 200. The moving objects include pedestrians, cyclists, non-human animals, and other vehicles, for example. The stationary objects include falling objects on the road, guardrails, curbs, road signs, road surface markings, and structures beside the road, for example. The peripheral monitoring sensor 20 outputs sensing information, which is external information regarding objects around the vehicle 200, to the vehicle position estimation device 100.

The peripheral monitoring sensor 20 acquires the external information regarding objects and road markings around the vehicle 200. More specifically, the peripheral monitoring sensor 20 detects information about longitudinal markings adjacent to both sides of the vehicle 200, the number of lanes on the road, and the number of lanes located on both sides of the vehicle 200. Further, the peripheral monitoring sensor 20 acquires mark information such as frontward road surface markings on the traveling lane of the vehicle 200, and distances from the vehicle 200 to the road edges located rightward and leftward of the vehicle 200.

The peripheral monitoring sensor 20 includes a front camera, millimeter wave radars as detection configurations for detection of an object. The front camera outputs, as the sensing information, image data obtained by photographing a front range of the vehicle 200, an analysis result of the image data, or both the image data and the analysis result. The multiple millimeter wave radars are arranged, for example, on each of the front and rear bumpers of the vehicle 200 at intervals from each other. The millimeter wave radars radiate a millimeter wave or a quasi-millimeter wave toward the surroundings of the vehicle 200. The millimeter wave radars generate the sensing information by a process of receiving reflected waves reflected by moving objects, stationary objects, or the like.

The vehicle parameter sensor unit 30 detects vehicle parameters related to traveling of the vehicle 200, for example, vehicle speed, acceleration, yaw rate, and the like. The vehicle parameter sensor unit 30 outputs detected data of the vehicle parameters to the vehicle position estimation device 100.

As shown in FIG. 2, the GNSS receiver 40 receives positioning signals from artificial satellites. Artificial satellites are also called positioning satellites. The GNSS receiver 40 is capable of receiving positioning signals from positioning satellites of at least one of multiple satellite positioning systems such as GPS, GLONASS, Galileo, IRNSS, QZSS, and Beidou. The GNSS receiver 40 outputs received positioning signals as GPS information to the vehicle position estimation device 100.

The map data storage unit 50 stores map data. The map data storage unit 50 is connected to the vehicle position estimation device 100, and the vehicle position estimation device 100 is capable of reading the map data from the map data storage unit 50. The map data defines a map on which roads are expressed by links and nodes. More specifically, in the map data, each link is a segment having a predetermined length along a road, and the links are sequentially connected via the nodes.

The map data includes road information about the roads. The road information includes number of lanes, a lane position, a lane shape, and mark information. The mark information is information such as symbols, arrows and figures provided on a road surface, and includes information on the road surface markings. In addition to road surface markings stipulated by laws such as the Road Traffic Act, the mark information includes information such as figures used only in specific areas. The information of the road surface markings includes information of longitudinal markings and road markings.

The longitudinal markings include an edge line and a lane line. The edge line is a longitudinal marking that indicates a boundary between a roadway and a road shoulder, and is indicated by a solid line. The lane line is a longitudinal marking that indicates a boundary between lanes and is indicated by solid or broken lines. The information on the longitudinal marking also includes information on the line color, such as yellow and white. Road markings are paints drawn on a road surface for traffic control and traffic regulation, such as turning prohibition, traffic division according to a traveling direction, and maximum speed.

The map data includes information on a non-lane section, which is a section where no lanes are marked on the road. In the non-lane section, the lane line is not shown, only the edge line is shown. The information on the non-lane section includes information indicating a length of the non-lane section and information indicating a position of the non-lane section.

For example, the map data storage unit 50 may be provided by a cloud server instead of a storage included in the vehicle position estimation device 100. The cloud server may transmit the map data to the vehicle position estimation device 100 in order to achieve the function of the map data storage unit 50.

The vehicle position estimation device 100 generates highly precise position information of the vehicle 200 by a combined positioning method that combines multiple types of acquired information. Further, the vehicle position estimation device 100 estimates one traveling lane in which the vehicle 200 travels on a road including multiple lanes.

The vehicle position estimation device 100 is a control device that executes a program stored in a storage medium and controls each unit. The vehicle position estimation device 100 includes at least one calculation processing device (i.e. CPU), and the storage medium for storing a program and data. The vehicle position estimation device 100 is provided by a microcontroller including a computer-readable storage medium. The storage medium is a non-transitional substantive storage medium that stores computer-readable programs and data non-temporarily. The storage medium is realized by a semiconductor memory, a magnetic disk, or the like.

The vehicle position estimation device 100 has an information acquisition unit 110 and a position estimation unit 120 as functional blocks. The information acquisition unit 110 acquires the sensing information from the peripheral monitoring sensor 20, vehicle parameter data from the vehicle parameter sensor unit 30, the GPS information from the GNSS receiver 40, and the map data from the map data storage unit 50. Therefore, the information acquisition unit 110 functions as an external information acquisition unit, a vehicle parameter acquisition unit, a satellite positioning acquisition unit, and a map data acquisition unit. The information acquisition unit 110 outputs the acquired information to the position estimation unit 120.

The position estimation unit 120 estimates the self-position of the vehicle 200 on the map based on the sensing data, the vehicle parameter data, the GPS information, and the map data. For example, the position estimation unit 120 estimates a latitude and longitude indicating a current position of the vehicle 200 from the GPS information acquired by the GNSS receiver 40. Based on the vehicle parameter data detected by the vehicle parameter sensor unit 30, the position estimation unit 120 determines whether the vehicle 200 is traveling on a straight road, estimates a curvature of a road on which the vehicle 200 is traveling, or determines whether the vehicle 200 travels out of the lane.

The position estimation unit 120 has a reliability calculation unit 121, a lane estimation unit 122, and a lane change determination unit 123 as sub-functional blocks. The reliability calculation unit 121 calculates a reliability of each lane when the vehicle 200 is traveling on a road having multiple lanes. The reliability of each lane indicates a probability of the vehicle 200 being traveling in the lane among the lanes.

The lane estimation unit 122 estimates a lane in which the vehicle 200 is located by using the reliability calculated by the reliability calculation unit 121. The lane estimation unit 122 determines, for example, a lane having the highest reliability among lanes as the lane in which the vehicle 200 is located. The lane estimation unit 122 does not limit the number of lanes in which the vehicle 200 is located to one, for example, when there are more than two lanes having the highest reliability.

The lane change determination unit 123 determines an occurrence of a lane change of the vehicle 200 based on the sensing information, the vehicle parameter, the GPS information, and the map data. The lane change is a change in traveling lane by the vehicle 200 moving from a lane to an adjacent lane on a right side or left side.

Next, the calculation of the reliability will be described. In the example shown in FIG. 3, the position estimation unit 120 estimates that the vehicle 200 is currently traveling in a first lane L1 of a four-lane road. However, in reality, the vehicle 200 is traveling in a second lane L2. According to the sensing information, the longitudinal markings adjacent to both sides of the vehicle 200 are both broken lines. The map data contains information on the longitudinal markings of the road that the vehicle is traveling, and the information indicates five longitudinal markings. And, the line types of the five longitudinal markings are as follows: the leftmost and rightmost longitudinal markings are solid lines, and the middle three are broken lines. Therefore, a lane having broken longitudinal markings on both sides can be the second lane L2 or the third lane L3. If the vehicle is traveling in the first lane L1, the left longitudinal marking should be a solid line and the right longitudinal marking should be a broken line.

Figure 3:
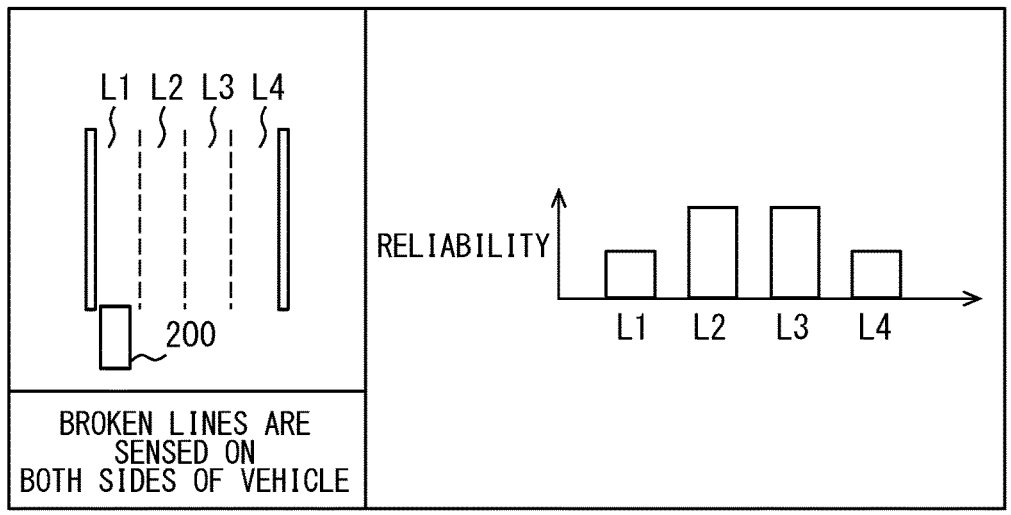
FIG. 3 is a diagram showing an example of a reliability calculation method using longitudinal markings.

Comparing the longitudinal marking information between the sensing information and the map data, the sensing information matches the information on the second lane L2 and the information on the third lane L3, but does not match the information on the first lane L1 and the information on the fourth lane L4. Therefore, in this case, the probabilities of the vehicle 200 being in the second lane L2 and the third lane L3 are higher than the probabilities of the vehicle 200 being in the first lane L1 and the fourth lane L4. Therefore, as shown in FIG. 3, the reliability indicating the probability is set to be higher in the second lane L2 and the third lane L3 than in the first lane L1 and the fourth lane L4. As a result, the position estimation unit 120 determines that the vehicle 200 is not in the first lane L1 using the calculated reliability, and re-estimates that the vehicle 200 is located in the second lane L2 or the third lane L3.

In this way, in the reliability calculation unit 121, information on longitudinal markings adjacent to both sides of the vehicle 200 obtained from the sensing information is compared with information on longitudinal markings of the map data. Then, in the reliability calculation unit 121, a reliability of a lane having longitudinal markings on both sides that matches with longitudinal markings of the map data is set to be higher than a reliability of a lane having longitudinal markings on both sides that does not match the longitudinal markings of the map data. The reliability calculation unit 121 determines the reliability using also, for example, a color of the longitudinal marking. The reliability calculation unit 121 determines whether the sensing information matches the information contained in the map data, depending on whether the longitudinal markings adjacent to both sides of the vehicle 200 are white or yellow, and sets the reliability.

Figure 4:
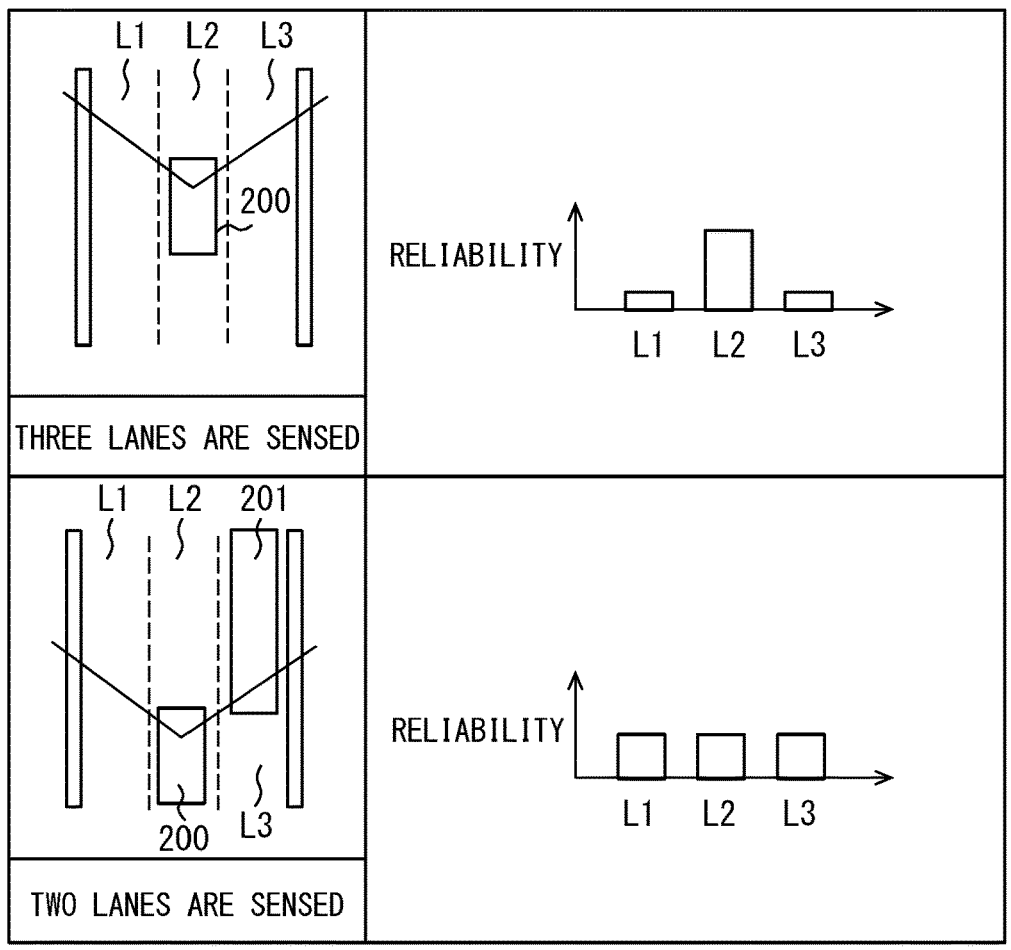
FIG. 4 is a diagram showing an example of a reliability calculation method using number of lanes.

Next, a reliability calculation method using the number of lanes will be described. As shown in FIG. 4, the vehicle 200 is traveling in the second lane L2 on a three-lane road. The sensing information includes a total number of lanes on the road on which the vehicle 200 is traveling, the number of lanes located on the left side of the vehicle 200, and the number of lanes located on the right side of the vehicle 200. Since the sensing information includes longitudinal marking information, the number of lanes is acquired using the number of longitudinal markings. In the example shown in FIG. 4, if the sensing information is appropriate, the number of lanes on the left side is one and the number of lanes on the right side is one.

Since the number of lanes of the traveling road is identified as three from the map data, the reliability calculation unit 121 is capable of estimating the traveling lane of the vehicle 200 from the numbers of lanes on both sides obtained from the sensing information. More specifically, when traveling in the first lane L1 of the three-lane road, the number of lanes on the left side is zero, and the number of lanes on the right side is two. When traveling in the second lane L2 of the three-lane road, the number of lanes on the left side is one, and the number of lanes on the right side is one. Further, when traveling in the third lane L3 of the three-lane road, the number of lanes on the left side is two, and the number of lanes on the right side is zero. Therefore, the reliability calculation unit 121, by using the detected number of lanes, increases the reliability of the traveling lane and decreases the reliability of the other lanes.

However, the peripheral monitoring sensor 20 may not be able to detect the number of lanes correctly. For example, if another vehicle 201 is driving in a lane adjacent to a right side of the vehicle 200, the right lane is not capable of being recognized, and the peripheral monitoring sensor 20 may detect the number of lanes such that the number of lanes on a left side of the vehicle 200 is one and the number of lanes on the right side of the vehicle 200 is zero using the sensing information. Therefore, since the detected number of lanes is different from the number of lanes in the map data, the reliability calculation unit 121 is not capable of determining the reliability of each lane.

Therefore, when the number of lanes in the map data and the total number of lanes in the sensing information match each other, as described above, the reliability of the lane that matches the map data in terms of the numbers of lanes on both sides is set to be higher than a reliability of the other lanes that do not match the map data. On the contrary, when the number of lanes in the map data and the total number of lanes in the sensing information do not match each other, there is a possibility that the sensing information is incorrect, so the reliability calculation unit 121 determines the reliability of all lanes to be equal.

In short, the reliability calculation unit 121 compares the total number of lanes in the sensing information with the total number of lanes in the map data. When the acquired total number of lanes matches the number of lanes in the map data, a reliability of a lane which is specified as a traveling lane of the vehicle 200 from the numbers of lanes on both sides of the vehicle 200 is set to be higher than the reliability of the other lanes by the reliability calculation unit 121.

Figure 5:
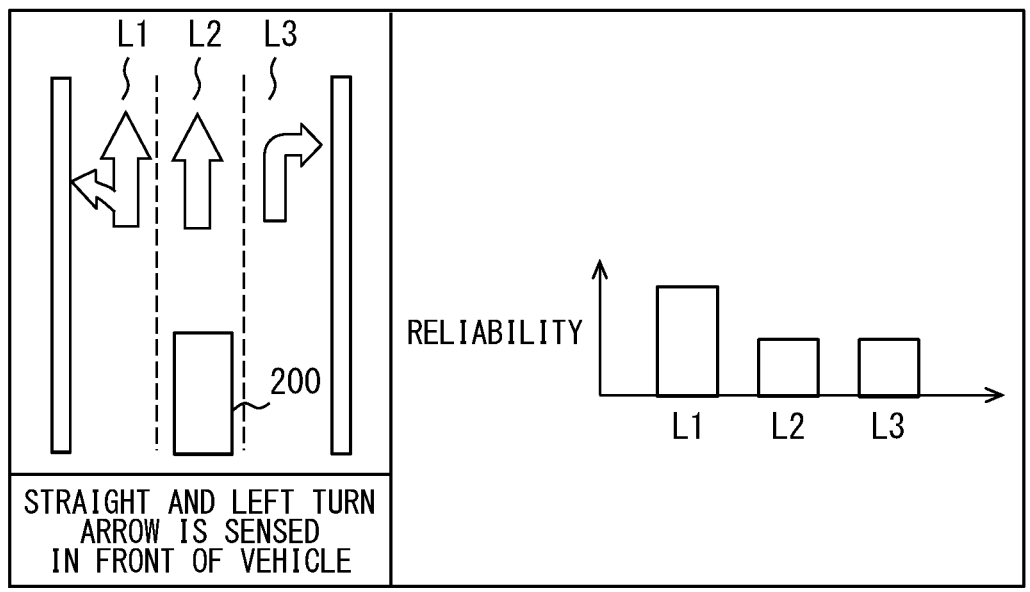
FIG. 5 is a diagram showing an example of a reliability calculation method using a road marking.
Figure 6:
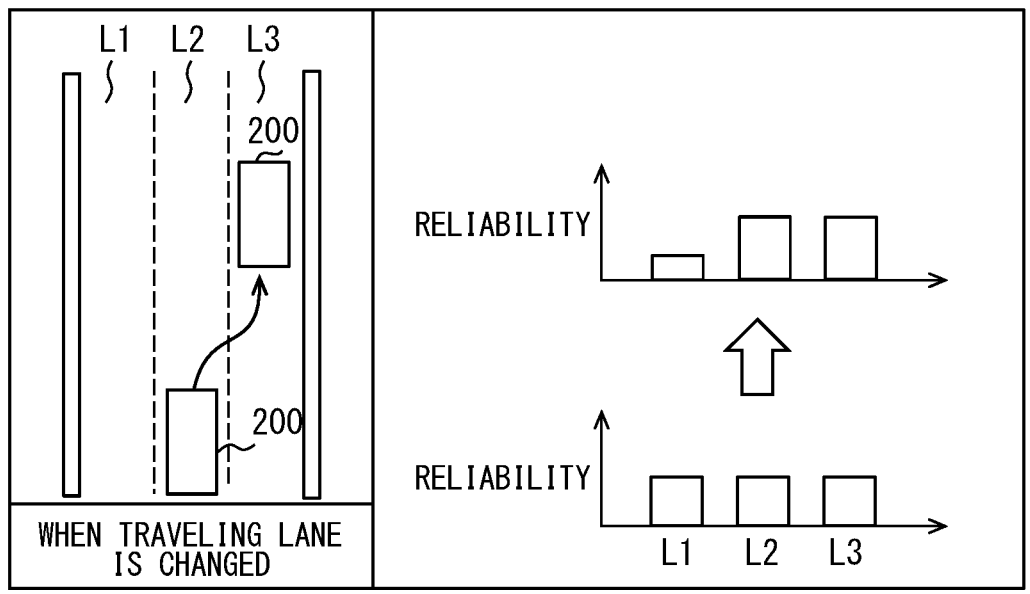
FIG. 6 is a diagram showing an example of a reliability calculation method using a lane change.

Next, a reliability calculation method using road markings will be described. In the example shown in FIG. 5, the position estimation unit 120 currently estimates that the vehicle 200 is in the second lane L2 that is a center lane of a three-lane road. However, in reality, the vehicle 200 is traveling in the first lane L1. Then, in the sensing information, a road surface marking in front of the vehicle 200 is a straight and left turn arrow. In the map data, the straight and left turn arrow is stored as a road surface marking located in the first lane L1. Therefore, the road surface marking in front of the vehicle 200 in the sensing information do not match the road surface marking included in the map data. If the vehicle 200 is traveling in the second lane L2, the road surface marking in front of the vehicle 200 should be a straight arrow. Therefore, in this case, as shown in FIG. 5, the reliability of the first lane L1 having a road surface marking that matches the straight and left turn arrow is set to be higher than a reliability of the second lane L2 and a reliability of the third lane L3 which do not have the matching road surface marking.

In short, the reliability calculation unit 121 compares the road surface markings included in the sensing information with the road surface markings included in the map data. Then, a reliability of a lane having a road surface marking that matches an acquired road surface marking is set to be higher than a reliability of a lane which does not have the matching road surface marking. As a result, the position estimation unit 120 re-estimates that the vehicle 200 is in the first lane L1 by using the reliability.

Next, a reliability calculation method using a lane changes will be described. In the example shown in FIG. 6, the position estimation unit 120 estimates that the vehicle 200 is currently traveling in a center lane of a three-lane road. In reality, the vehicle 200 is also traveling in the second lane L2. Then, a case in which the lane change determination unit 123 determines that the traveling lane has been changed rightward of the vehicle 200 will be described.

When the lane change determination unit 123 determines that the traveling lane has been changed rightward, the probability of being in the first lane L1 is lower than the probabilities of being in the second lane L2 and the third lane L3. Conversely, when the lane change determination unit 123 determines that the traveling lane has been changed to leftward, the probability of being in the third lane L3 is lower than the probabilities of being in the first lane L1 and the second lane L2. Therefore, in the example shown in FIG. 6, since the vehicle 200 changed the traveling lane rightward, the probabilities of being in the second lane L2 and the third lane L3 is calculated to be higher than a probability of being in the first lane L1.

When the vehicle 200 is traveling in a two-lane road and the lane change determination unit 123 determines that the traveling lane has been changed rightward, the probability of being in the first lane L1 is lower than the probability of being in the second lane L2. Conversely, when the lane change determination unit 123 determines that the traveling lane has been changed leftward, the probability of being in the second lane L2 is lower than the probability of being in the first lane L1.

In short, when the lane change determination unit 123 determines that the traveling lane has been changed, a reliability of a lane located at an end in a direction opposite to a direction of the lane change is set to be lower than a reliability of another lane by the reliability calculation unit 121.

As described above, the reliability calculation unit 121 calculates the reliabilities of each lane using the number of lanes, the road surface markings, and the lane changes. Then, the reliability calculation unit 121 calculates an integrated reliability by integrating the reliabilities, which are calculated by using different features, using a weighting factor for the reliabilities. For example, the reliability using the road surface markings is set to be more important than the reliability using the lane changes. Then, the weighting factor for the reliability using the road surface marking is set to be high. Accordingly, the position estimation unit 120 is capable of estimating the traveling lane in which the vehicle 200 is traveling using the integrated reliability.

Next, a lane change determination method of the lane change determination unit 123 will be described. As a first determination method, the lane change determination unit 123 determines that a lane change has occurred when the vehicle 200 travels across a longitudinal marking during the longitudinal marking being detected. As a second determination method, the lane change determination unit 123 determines that a lane change has occurred when the vehicle 200 is traveling near a center of a traveling lane, a distance between the center of the traveling lane and a center position of the vehicle 200 is increasing, and the distance exceeds a predetermined threshold.

As a third determination method, the lane change determination unit 123 determines whether the vehicle 200 is changing lanes toward one of road edges by using decrease in distance from the vehicle 200 to the one of road edges or increase in distance from the vehicle 200 to the other of the road edges. The third determination method is an effective method when the peripheral monitoring sensor 20 is not capable of recognizing longitudinal markings but recognizing the road edges. The longitudinal markings may be difficult to be detected due to deterioration of the lane markings or presence of puddles, but the road edges are often easy to be detected due to steps and the like.

Figure 7:
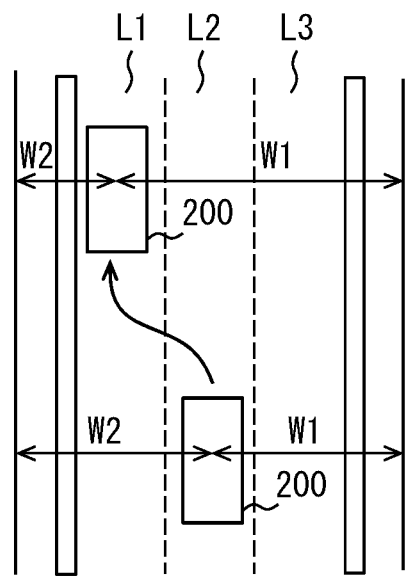
FIG. 7 is a diagram showing an example of a lane change determination method.

More specifically, as shown in FIG. 7, the peripheral monitoring sensor 20 detects a left edge distance W2 from a center of the vehicle 200 to a left road edge and a right edge distance W1 from the center of the vehicle 200 to a right road edge as the distances to the road edges. When the traveling lane is changed leftward as shown in FIG. 7, the left edge distance W2 decreases, and the right edge distance W1 increases with the decrease of the left edge distance W2. Then, when an amount of the decrease or increase exceeds the threshold, the lane change determination unit 123 determines that the vehicle 200 has changed lanes.

As a fourth determination method, the lane change determination unit 123 determines that the vehicle 200 is not changing lanes and has completed the lane change when a lane having a highest reliability calculated by the reliability calculation unit 121 among the lanes changes from one lane to another. The reliability is calculated for each lane, and if there is a lane with high reliability, a probability of the vehicle 200 being located in that lane is high. Therefore, when a lane with high reliability is changed to another lane, the lane change determination unit 123 determines that the traveling lane has been changed.

In this manner, the lane change determination unit 123 determines a lane change using the above four determination methods. The lane change determination unit 123 may determine occurrence of a lane change using only one of the four determination methods, or may determine a lane change by combining determination results of two or more determination methods.

As described above, the vehicle position estimation device 100 of the present embodiment calculates a reliability for each lane when a vehicle 200 is traveling on a road having multiple lanes. Since the reliability is calculated for each lane, the reliability is not a value that depends on an in-lane position of a vehicle. Therefore, even if an accuracy in estimation based on vehicle parameters is poor, the reliability can be calculated for each lane based on the sensing information and the map data. As a result, the vehicle position estimation device 100 is capable of estimating a traveling lane in which the vehicle 200 is traveling by using the reliability. So, an accuracy in estimation of the traveling lane can be increased.

In the present embodiment, in the reliability calculation unit 121, information on longitudinal markings adjacent to both sides of the vehicle 200 obtained from the sensing information is compared with information on longitudinal markings of the map data. Then, in the reliability calculation unit 121, a reliability of a lane having longitudinal markings on both sides that matches with longitudinal markings of the map data is set to be higher than a reliability of a lane having longitudinal markings on both sides that does not match the longitudinal markings of the map data. Since the longitudinal markings adjacent to both sides of the vehicle 200 is used, the reliability accuracy can be improved.

In the present embodiment, the reliability calculation unit 121 compares the total number of lanes in the sensing information with the total number of lanes in the map data. When the acquired total number of lanes matches the number of lanes in the map data, a reliability of a lane which is specified as a traveling lane of the vehicle 200 from the numbers of lanes on both sides of the vehicle 200 is set to be higher than the reliability of the other lanes by the reliability calculation unit 121. Since the numbers of lanes on both sides of the vehicle 200 is used, the reliability accuracy can be further improved.

In the present embodiment, the reliability calculation unit 121 compares the mark information included in the sensing information with the mark information included in the map data. Then, a reliability of a lane having mark information that matches an acquired mark information is set to be higher than a reliability of a lane which does not have the matching mark information. Since the mark information is used, the reliability accuracy can be further improved.

In the present embodiment, when the lane change determination unit 123 determines that the traveling lane has been changed, a reliability of a lane located at an end in a direction opposite to a direction of the lane change is set to be lower than a reliability of another lane by the reliability calculation unit 121. Since the lane change is used, an accuracy in estimation of a lane having a low reliability can be increased.

In the present embodiment, the lane change determination unit 123 determines whether the vehicle 200 is changing lanes toward one of road edges by using decrease in distance from the vehicle 200 to the one of road edges or increase in distance from the vehicle 200 to the other of the road edges. Since it is determined whether the traveling lane is changed by using the distance to the road edge, the lane change determination unit 123 is capable of determining occurrence of the lane change even when a longitudinal marking cannot be detected.

In the present embodiment, the lane change determination unit 123 determines that the vehicle has completed the lane change when a lane having a highest reliability calculated by the reliability calculation unit 121 among the lanes changes from one lane to another. Thus, the lane change determination unit 123 is capable of determining the completion of the lane change by using the reliability.

In the present embodiment, the reliability calculation unit 121 calculates an integrated reliability by integrating the reliabilities, which are calculated by using different features, using a weighting factor for the reliabilities. Since the integrated reliability is used, the reliability accuracy can be further improved.

Other Embodiments

The present disclosure is not limited to the preferred embodiments of the present disclosure described above. Various modifications may be made without departing from the subject matters of the present disclosure.

It should be understood that the configurations described in the above-described embodiments are example configurations, and the present disclosure is not limited to the foregoing descriptions. The scope of the present disclosure encompasses claims and various modifications of claims within equivalents thereof.

In the above-described first embodiment, the information acquisition unit 110 has the functions of an external information acquisition unit, a vehicle parameter acquisition unit, a satellite positioning acquisition unit, and a map data acquisition unit, but is not limited to a configuration in which these are integrated, and each function may be realized in separate units.

In the above-described first embodiment, the functions realized by the vehicle position estimation device 100 may be realized by hardware and software different from those described above or by a combination of the hardware and the software. The vehicle position estimation device 100 may communicate with, for example, another control device, and the other control device may execute a part or all of the process. When the vehicle position estimation device 100 is realized by an electronic circuit, the vehicle position estimation device 100 may be realized by a digital circuit or an analog circuit, including a large number of logic circuits.

Whereas the vehicle position estimation device 100 is used in a vehicle in the above-described first embodiment, the vehicle position estimation device 100 is not limited to a state being mounted on a vehicle, and at least a part of the vehicle position estimation device 100 may not be mounted on a vehicle.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

The invention claimed is:

1. A vehicle position estimation device mounted on a vehicle, comprising:
    an external information acquisition unit configured to acquire external information regarding objects and road markings around the vehicle;
    a vehicle parameter acquisition unit configured to acquire a vehicle parameter related to traveling of the vehicle;
    a satellite positioning acquisition unit configured to acquire a latitude and longitude of a position of the vehicle from a satellite positioning system;
    a map data acquisition unit configured to acquire map data including road information about lanes; and
    a position estimation unit configured to estimate a self-position of the vehicle on a map based on the external information, the vehicle parameter, the latitude and longitude, and the map data, wherein the position estimation unit includes:
a reliability calculation unit configured to calculate a reliability of each lane based on the external information and the map data when the vehicle is traveling on a road having multiple lanes, the reliability of each lane indicating a probability of the vehicle being traveling in the lane among the lanes; and
a lane estimation unit configured to estimate a lane in which the vehicle is located by using the reliability calculated by the reliability calculation unit.

2. The vehicle position estimation device according to claim 1, wherein
the external information acquisition unit acquires information on longitudinal markings adjacent to both sides of the vehicle,
the road information of the map data includes information on the longitudinal markings,
the reliability calculation unit compares the information on longitudinal markings adjacent to both sides of the vehicle acquired by the external information acquisition unit with the information on longitudinal markings of the map data, and
the reliability calculation unit calculates the reliability for each lane such that a reliability of a lane having longitudinal markings on both sides that matches longitudinal markings of the map data is set to be higher than a reliability of a lane having longitudinal markings on both sides that does not match the longitudinal markings of the map data.

3. The vehicle position estimation device according to claim 1, wherein
the external information acquisition unit acquires a total number of lanes on the road on which the vehicle is traveling, a number of lanes located on a left side of the vehicle, and a number of lanes located on a right side of the vehicle,
the road information of the map data includes information on the number of lanes on the road,
the reliability calculation unit compares the total number of lanes acquired by the external information acquisition unit with the total number of lanes of the map data, and
when the acquired total number of lanes matches the number of lanes of the map data, the reliability calculation unit calculates the reliability for each lane such that a reliability of a lane which is specified as a traveling lane of the vehicle from the numbers of lanes on both sides of the vehicle is set to be higher than a reliability of another lane.

4. The vehicle position estimation device according to claim 1, wherein
the external information acquisition unit acquires mark information about markings located frontward of the vehicle on a road surface of a traveling lane of the vehicle,
the road information of the map data includes the mark information,
the reliability calculation unit compares the mark information acquired by the external information acquisition unit with the mark information of the map data, and
the reliability calculation unit calculates the reliability for each lane such that a reliability of a lane having a mark information that matches an acquired mark information is set to be higher than a reliability of a lane which does not have the matching mark information.

5. The vehicle position estimation device according to claim 1, wherein
the vehicle position estimation device includes a lane change determination unit configured to determine an occurrence of a lane change of the vehicle based on the external information, the vehicle parameter, the latitude and longitude, and the map data, and
when the lane change determination unit determines that a traveling lane has been changed, the reliability calculation unit calculates the reliability for each lane such that a reliability of a lane located at an end in a direction opposite to a direction of the lane change is set to be lower than a reliability of another lane.

6. The vehicle position estimation device according to claim 5, wherein
the external information acquisition unit acquires distances from the vehicle to road edges located rightward and leftward of the vehicle, and
the lane change determination unit determines whether the vehicle is changing lanes toward one of the road edges by using decrease in distance to the one of the road edges or increase in distance to the other of the road edges.

7. The vehicle position estimation device according to claim 5, wherein
the lane change determination unit determines that the vehicle is not changing lanes and has completed a lane change when a lane having a highest reliability calculated by the reliability calculation unit among the lanes changes from one lane to another.

8. The vehicle position estimation device according to claim 1, wherein
the reliability calculation unit calculates an integrated reliability by integrating reliabilities, which are calculated by using different features, using a weighting factor for the reliabilities.

9. A vehicle position estimation device mounted on a vehicle, comprising
a controller configured to:
acquire external information regarding objects and road markings around the vehicle, a vehicle parameter related to traveling of the vehicle, a latitude and longitude of a position of the vehicle from a satellite positioning system, and map data including road information about lanes;
estimate a self-position of the vehicle on a map based on the external information, the vehicle parameter, the latitude and longitude, and the map data;
calculate a reliability of each lane based on the external information and the map data when the vehicle is traveling on a road having multiple lanes, the reliability of each lane indicating a probability of the vehicle being traveling in the lane among the lanes; and
estimate a lane in which the vehicle is located by using the reliability.

\* \* \* \* \*